423-16 SR
FIP8307 OR T 102,906

United States Defensive Publication [19] (H) [11] T102,906
Brown et al. [43] Apr. 5, 1983

[54] METHOD OF REMOVING PHOSPHORUS IMPURITIES FROM YELLQWCAKE

[76] Inventors: Richard A. Brown, 112 Glendale Dr., Trenton, N.J. 08618; Donald C. Winkley, 2519 Laguna Shores, Corpus Christi, Tex. 78418

[21] Appl. No.: 210,063

[22] Filed: Nov. 24, 1980

[51] Int. Cl.[3] ..... C01G 1/02; C01G 43/025
[52] U.S. Cl. ..... 423/16

[57] ABSTRACT

Phosphorus impurities are removed from yellowcake by dissolving it in hydrochloric or sulfuric acid to a $U_3O_8$ assay of at least 150 g/l at a pH of 2; precipitating uranium peroxide with hydrogen peroxide while keeping the pH between 2.2 and 2.6 and recovering the uranium peroxide from the phosphorus impurities remaining in solution.

4 Claims, No Sheets Drawing,
15 Pages Specification

The file of this unexamined application may be inspected and copies thereof may be purchased (849 O.G. 1221, Apr. 9, 1968).